US 6,501,388 B1

(12) United States Patent
Nasuda

(10) Patent No.: US 6,501,388 B1
(45) Date of Patent: Dec. 31, 2002

(54) RADIO SIGNAL SELECTIVE-CALLING RECEIVER AND METHOD OF RECEIVING RADIO SIGNALS

(75) Inventor: Takaaki Nasuda, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/425,977

(22) Filed: Oct. 25, 1999

(30) Foreign Application Priority Data

Oct. 26, 1998 (JP) .......................................... 10-303660

(51) Int. Cl.⁷ ................................................ H04L 7/00
(52) U.S. Cl. .............................. 340/825.2; 340/825.21; 340/825.44; 455/38.1; 455/38.2; 455/51.2; 455/39
(58) Field of Search ...................... 340/825.2, 825.21, 340/825.44, 825.69, 825.72, 825.54; 455/51.2, 39, 38.1, 38.2

(56) References Cited

U.S. PATENT DOCUMENTS

| | | | | |
|---|---|---|---|---|
| 4,414,676 A | * | 11/1983 | Kraul et al. ................. | 375/116 |
| 4,649,538 A | * | 3/1987 | De Luca et al. .............. | 371/25 |
| 5,261,118 A | * | 11/1993 | Vanderspool, II et al. . | 455/51.2 |
| 5,414,419 A | * | 5/1995 | Schwondeman et al. ...................... | 340/825.44 |
| 5,444,672 A | * | 8/1995 | Kushita ........................ | 368/47 |
| 5,739,762 A | * | 4/1998 | Kuramatsu et al. .... | 340/825.21 |

FOREIGN PATENT DOCUMENTS

| | | |
|---|---|---|
| JP | 64-3413 | 1/1989 |
| JP | 2-218231 | 8/1990 |
| JP | 2-504096 | 11/1990 |
| JP | 6-56976 | 7/1994 |
| JP | 10-56664 | 2/1998 |
| JP | 10-145255 | 5/1998 |
| JP | 10-150682 | 6/1998 |

* cited by examiner

Primary Examiner—Daryl Pope
(74) Attorney, Agent, or Firm—Young & Thompson

(57) ABSTRACT

A radio signal selective-calling receiver includes a detector which detects a difference in frequency between a first base clock signal of the radio signal selective-calling receiver and a second base clock signal of a base station, based on third signals transmitted from the base station. The base station is in communication with the radio signal selective-calling receiver through a communication line. The radio signal selective-calling receiver also includes a compensator which compensates for the first base clock signal with respect to a frequency in accordance with the detected difference, and transmits a base clock signal having been compensated for, and a signal transmitter which transmits a synchronization clock signal on the basis of the base clock signal having been compensated for by the compensator. The radio signal selective-calling receiver detects a difference in frequency between the first and second base clock signals, and thus, accomplish synchronization in the unit of bit so that even if the accuracy of the second base clock signal is significantly degraded, the radio signal selective-calling receiver can prevent a calling signal from being skipped.

16 Claims, 7 Drawing Sheets

US 6,501,388 B1

RADIO SIGNAL SELECTIVE-CALLING RECEIVER AND METHOD OF RECEIVING RADIO SIGNALS

BACKGROUND OF THE INVENTION

1. Field of the Invention

The invention relates to a radio signal selective-calling receiver, and more particularly to a radio signal selective-calling receiver which is capable of detecting a difference in frequency between a base clock signal of a base station and a base clock signal of the radio signal selective-calling receiver itself in paging system, and establishing synchronization.

2. Description of the Related Art

A signal processing system for a radio signal selective-calling receiver is grouped into NTT style and POCSAG (Post Office Code Standardization Advisory Group) style.

NTT style is a perfect synchronization system in which signals are always transmitted, whereas POCSAG style is a preamble synchronization system in which signals are transmitted only when necessary. In addition, NTT style puts emphasis on enhancement of a rate at which signals are intermittently received, whereas POCSAG style puts emphasis on shortening delayed time in calling.

A lot of radio signal selective-calling receivers have been suggested so far.

For instance, Japanese Patent Publication No. 64-3413 has suggested a radio signal selective-calling receiver which stores a plurality of calling numbers through a small-sized circuitry. The suggested radio signal selective-calling receiver includes a programmable read only memory (PROM) and a decoder equipped within PROM. The radio signal selective-calling receiver attempts to reduce the number of wirings connecting PROM to the decoder, by reading out in series what is stored in PROM.

Japanese Unexamined Patent Publication No. 2-218231 has suggested a radio signal selective-calling receiver which compensates for an oscillation frequency of a local oscillator with respect to temperature. The suggested radio signal selective-calling receiver includes a device having a capacity variable in accordance with an output of a stabilized power source, in a local oscillation circuit to thereby compensate for the local oscillation circuit with respect to temperature.

Japanese Unexamined Patent Publication No. 2-504096 has suggested a data communication device resulted from improvement of a pager. The suggested data communication device is designed to include a random access memory storing broadcast messages therein and amending operation of a selected pager through broadcasting, to thereby provide flexibility to pager's operation such as storage of data and retrieval of data.

Japanese Patent Publication No. 6-56976 has suggested a radio signal selective-calling receiver detecting signals in intermittent signal-receiving operation by counting the number of turning point signals inside and outside window signals which are in synchronization with synchronization clock signals.

The suggested radio signal selective-calling receiver is capable of stopping intermittent signal-receiving operation by subsequent signals, even though a specific pre-signal is not received, by detecting the counted number of turning point signals in the form of a signal.

A base clock signal of a base station in conventional paging system including the above-mentioned prior systems has an accuracy of ±100 ppm or smaller in accordance with the standard. However, some base stations in paging system now actually in use employs a base clock signal having an accuracy in the range of 400 to 500 ppm, which is remarkably out of the standard.

If a radio signal selective-calling receiver is situated in an area covered by a base station which transmits a base clock signal with less accuracy, a call is sometimes skipped in the radio signal selective-calling receiver when calls are received, because of a difference in bit.

Hereinbelow is explained how a preamble signal is recognized in POCSAG code.

A preamble signal illustrated in FIG. 1(A) is a signal having been transmitted from a base station and demodulated by a radio signal selective-calling receiver in the case that there is no deviation in a base clock signal of a base station.

A signal illustrated in FIG. 1(B) is a synchronization clock signal for introducing data into a radio signal selective-calling receiver, and is generated based on a base clock signal transmitted from a base station. A leading edge of the synchronization clock signal is overlapped turning points of the demodulated signals illustrated in FIG. 1(A) to thereby establish synchronization in the unit of bit, and data is judged at a trailing edge of the synchronization clock signal.

Data is judged at the trailing edges of the synchronization clock signal illustrated in FIG. 1(B), namely at T1, T2, T3, T4 and T5. In the demodulated signal illustrated in FIG. 1(A), assuming that a lower level is represented with zero (0) and a high level is represented with one (1), data has a value of zero at the time T1, for instance. Hence, the demodulated signal is recognized to have values 0, 1, 0, 1 and 0 at T1, T2, T3, T4 and T5, respectively.

FIG. 1(C) illustrates a preamble signal being demodulated, which signal is obtained when a base clock signal of a base station is negatively deviated in paging system. In the demodulated signal illustrated in FIG. 1(C), assuming that a lower level is represented with zero (0) and a high level is represented with one (1), the demodulated signal has a value of zero at the time T1, for instance. Hence, if data is judged at the trailing edges of the base clock signal illustrated in FIG. 1(B), data is recognized to have values 0, 1, 0, 1 and 1 at T1, T2, T3, T4 and T5, respectively. Thus, the demodulated signal illustrated in FIG. 1(C) is not properly recognized as a preamble signal.

Japanese Unexamined Patent Publication No. 10-150682 has suggested an apparatus for making communication between a base station and a mobile station and for compensating for a local oscillation frequency of the mobile station. The apparatus is comprised of a transmitter for transmitting a calling signal from the base station to the mobile station which calling signal is comprised of a frame synchronization signal and a data signal, a receiver for receiving the calling signal at the mobile station, and a compensator for compensating for a local oscillation frequency of the mobile station in accordance with a frequency of the frame synchronization signal having been received at the receiver.

Japanese Unexamined Patent Publication No. 10-145255 has suggested a radio signal selective-calling receiver including a capacitor having a capacity variable in accordance with a voltage applied thereto, a voltage source which applies a voltage across the capacitor, and a controller controlling a voltage generated by the voltage source.

Japanese Unexamined Patent Publication No. 10-56664 has suggested a radio signal calling receiver including first means for detecting deviation in synchronization by comparing synchronization signals transmitted from a base station, to each other while a synchronization detecting window is open, and for maintaining synchronization in accordance with the detected deviation, and second means for varying a period in which the synchronization detecting window is open, in accordance with a cycle at which radio signals are to be received which cycle is assigned to a pager.

SUMMARY OF THE INVENTION

It is an object of the present invention to provide a radio signal selective-calling receiver which is capable of detecting a difference in frequency between a base clock signal transmitted from a base station and a base clock signal of the radio signal selective-calling receiver itself, and accomplishing synchronization in the unit of bit.

It is also an object of the present invention to provide a method of receiving radio signals in a radio signal selective-calling receiver which method is capable of doing the same as mentioned above.

In one aspect of the present invention, there is provided a radio signal selective-calling receiver including (a) a detector which detects a difference in frequency between a first base clock signal of the radio signal selective-calling receiver and a second base clock signal of a base station, based on third signals transmitted from the base station which is in communication with the radio signal selective-calling receiver through communication line, (b) a compensator which compensates for the first base clock signal with respect to a frequency in accordance with the detected difference, and transmits a base clock signal having been compensated for, and (c) a signal transmitter which transmits a synchronization clock signal on the basis of the base clock signal having been compensated for by the compensator.

For instance, the third signals are transmitted from the base station to establish synchronization in the unit of bit in preamble synchronization system.

It is preferable that the compensator compensates for the first base clock signal with respect to a frequency, based on a dc voltage produced in accordance with the detected difference.

It is preferable that the synchronization clock signal has the same transmission rate as a transmission rate of the third signals having been demodulated.

It is preferable that the detector is comprised of (a1) an edge detector transmitting edge signals which define leading and trailing edges of the third signals having been demodulated, (a2) a divider dividing a frequency of the first base clock signal and transmitting the thus divided base clock signal, and (a3) a phase-comparator transmitting a phase-difference signal indicative of the detected difference, based on a phase of the edge signals and a phase of the divided base clock signals.

It is preferable that the compensator is comprised of (b1) an integrator converting a phase-difference signal indicative of the detected difference, into a dc voltage, and (b2) a base clock oscillator compensating for the first base clock signal with respect to a frequency in accordance with the thus produced dc voltage.

In another aspect of the present invention, there is provided a method of receiving a radio signal in a radio signal selective-calling receiver, including the steps of (a) detecting a difference in frequency between a first base clock signal of the radio signal selective-calling receiver and a second base clock signal of a base station, based on third signals transmitted from the base station which is in communication with the radio signal selective-calling receiver through communication line, (b) compensating for the first base clock signal with respect to a frequency in accordance with the detected difference, and transmitting a base clock signal having been compensated for, and (c) transmitting a synchronization clock signal on the basis of the compensated frequency of the base clock signal.

It is preferable that the method further includes the step of producing a dc voltage in accordance with the detected difference, and wherein the first base clock signal is compensated for with respect to a frequency, based on the dc voltage.

For instance, the step (a) may be comprised of (a1) transmitting edge signals which define leading and trailing edges of the third signals having been demodulated, (a2) dividing a frequency of the first base clock signal and transmitting the thus divided base clock signal, and (a3) transmitting a phase-difference signal indicative of the detected difference, based on a phase of the edge signals and a phase of the divided base clock signals.

For instance, the step (b) may be comprised of (b1) converting a phase-difference signal indicative of the detected difference, into a dc voltage, and (b2) compensating for the first base clock signal with respect to a frequency in accordance with the thus produced dc voltage.

In still another aspect of the present invention, there is provided a data communication system including a base station and at least one radio signal selective-calling receiver such as one mentioned above, the base station transmitting third signals to establish synchronization in the unit of bit in preamble synchronization system, and being in communication with the radio signal selective-calling receiver through communication line.

In accordance with the present invention, it is possible to prevent a calling signal from being skipped, even if accuracy of a base clock signal transmitted from a base station is significantly degraded.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 2:
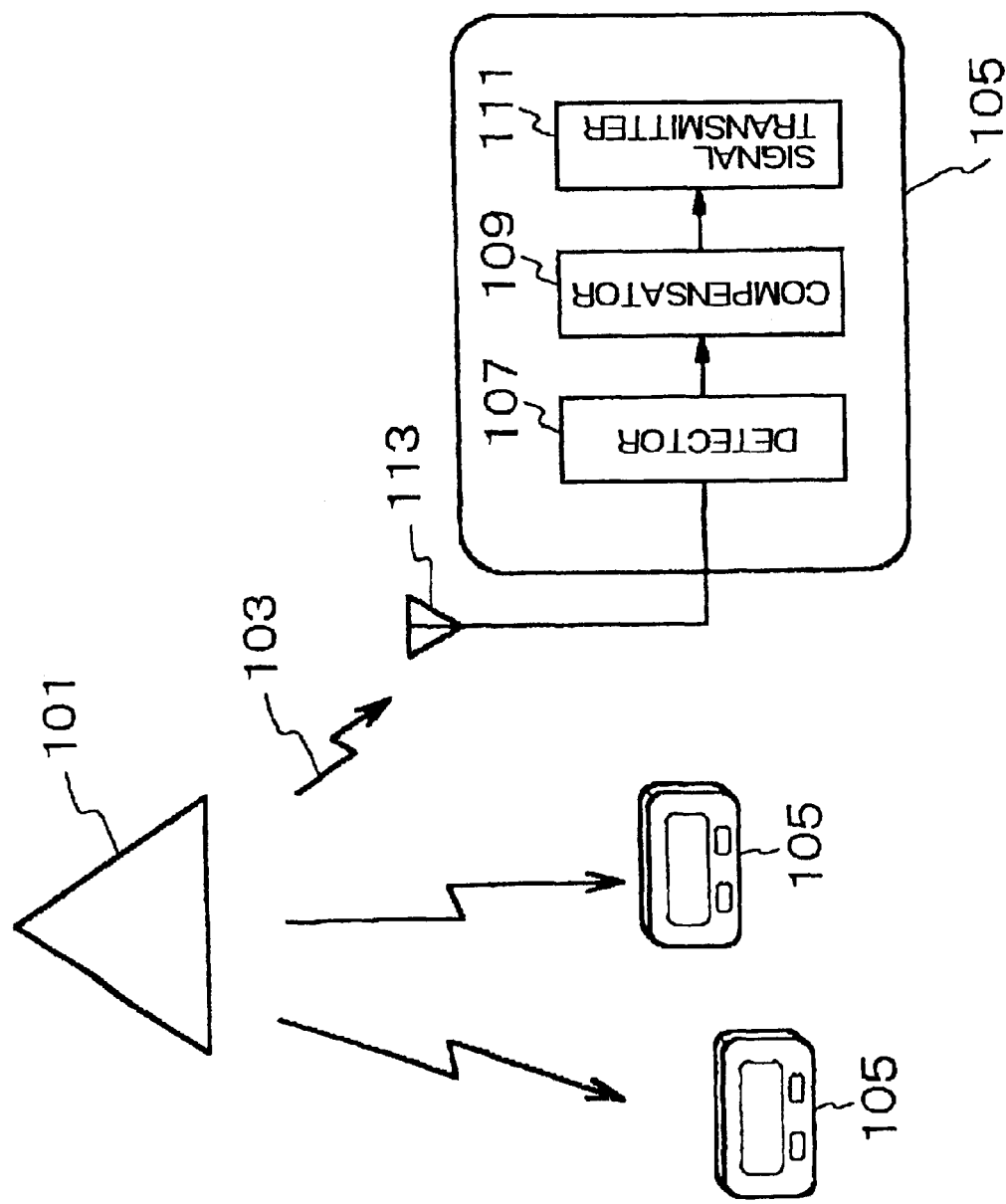
FIG. 2 is a functional block diagram of a radio signal selective-calling receiver in accordance with the preferred embodiment of the present invention.

FIG. 2 is a functional block diagram of a radio signal selective-calling receiver in accordance with an embodiment of the present invention.

As illustrated in FIG. 2, paging system is comprised of a base station 101 and a radio signal selective-calling receiver 105 situated in a service area covered by the base station 101. The radio signal selective-calling receiver 105 is in communication with the base station 101 through communication line.

The base station 101 transmits a signal 103 to the radio signal selective-calling receiver 105. The signal 103 is POCSAG (Post Office Code Standardization Advisory Group) signal used for establish synchronization in the unit of bit.

The radio signal selective-calling receiver 105 is comprised of a detector 107, a compensator 109 and a signal transmitter 111. The radio signal selective-calling receiver 105 operates in accordance with base clock signals to be produced based on base clock signals transmitted from the base station 101.

The detector 107 detects a difference in frequency between a base clock signal of itself and a base clock signal transmitted from the base station 101.

The compensator 109 compensates for a frequency of the base clock signal of the radio signal selective-calling receiver 105 in accordance with the difference detected by the detector 107. The compensator 109 transmits a base clock signal having been compensated for by itself.

The signal transmitter 111 transmits a synchronization clock signal on the basis of the base clock signal having been compensated for by the compensator 109.

Figure 3:
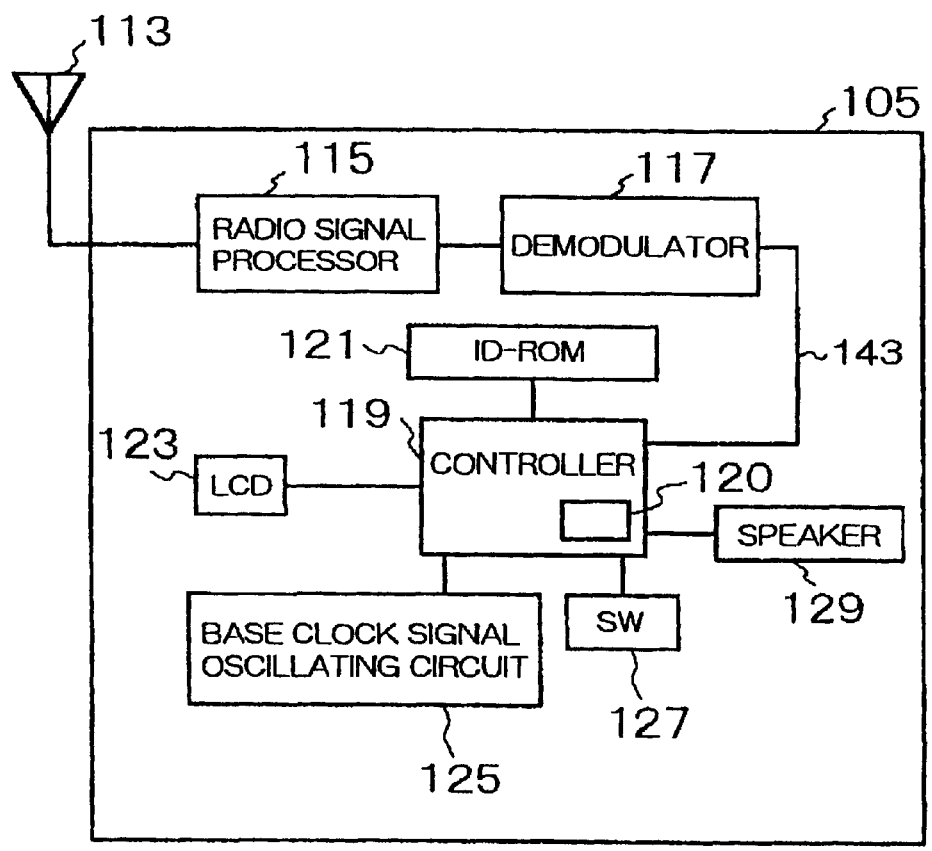
FIG. 3 is a block diagram of a radio signal selective-calling receiver in accordance with the preferred embodiment of the present invention.

FIG. 3 is a block diagram of the radio signal selective-calling receiver 105. The radio signal selective-calling receiver 105 is comprised of an antenna 113, a radio signal processor 115 receiving radio signals from the antenna 113, a demodulator 117 demodulating radio signals transmitted from the radio signal processor 115, a controller 119 receiving the demodulated signals from the demodulator 117, ID-ROM 121 electrically connected to and controlled by the controller 119, a liquid crystal display (LCD) 123 electrically connected to and controlled by the controller 119, a base clock signal oscillating circuit 125 electrically connected to and controlled by the controller 119, a switch 127, and a speaker 129 electrically connected to and controlled by the controller 119.

The controller 119 includes therein a circuit 120 for compensating for a base clock signal.

The radio signal processor 115 receives the signals 103 from the base station 101 through the antenna 113. The demodulator 117 demodulates the signals transmitted from the radio signal processor 115, and transmits a demodulated signal 143 to the controller 119.

ID-ROM 121 stores a calling number of the radio signal selective-calling receiver 105 therein. LCD 124 displays received messages and the like.

The base clock signal oscillating circuit 125 transmits various timing signals in accordance with a base clock signals produced therein and a compensated base clock signal which will be mentioned later. Herein, the timing signals are signals used for introducing various data into the radio signal selective-calling receiver 105, which data includes the signal 103 transmitted from the base station 101 and a signal for turning the radio signal processor 115 on.

The switch 127 receives a command such as one for reading out message, from an external device. The speaker 129 annunciates a user that a calling number of the radio signal selective-calling receiver 105 has been received.

Figure 4:
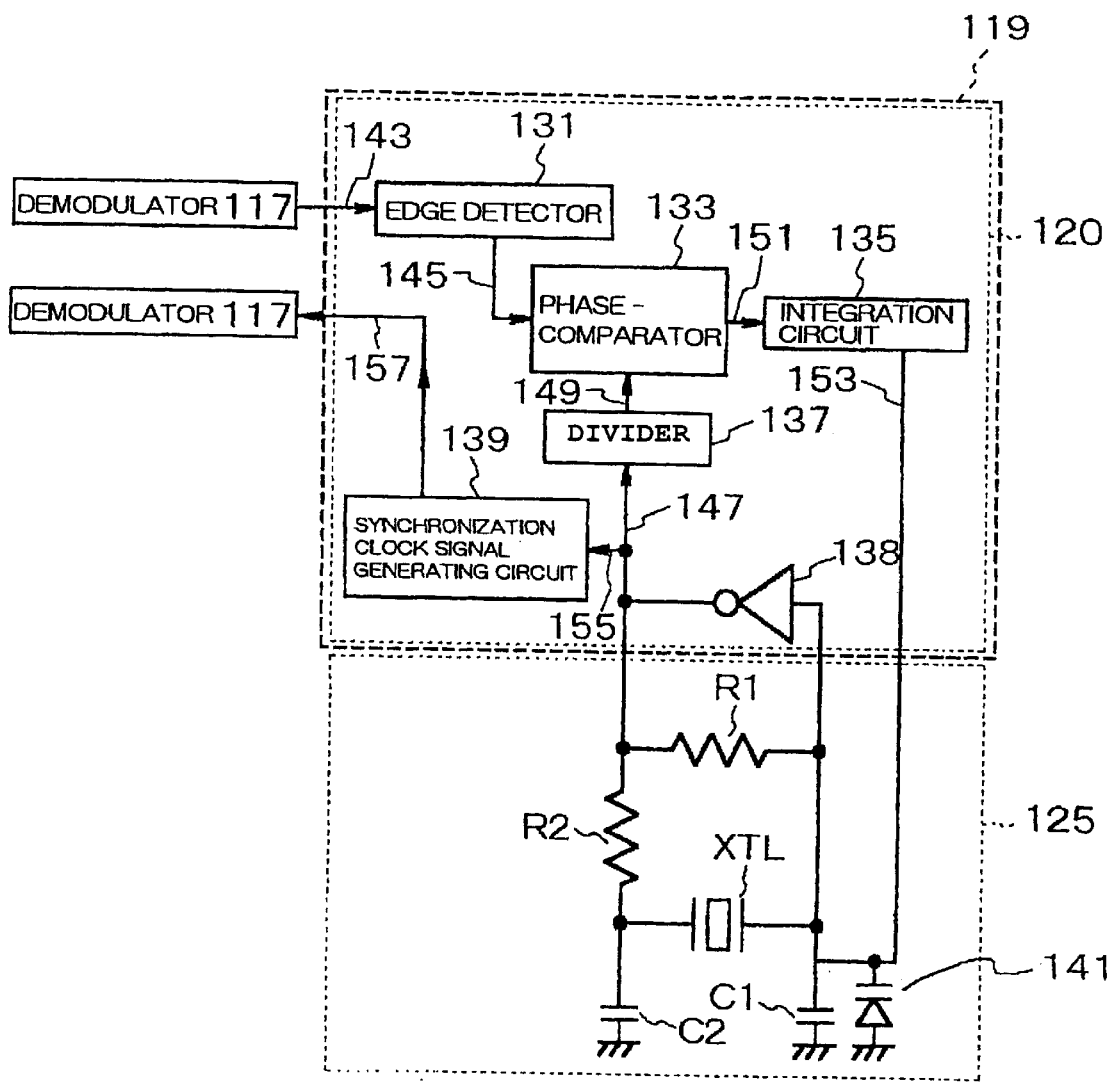
FIG. 4 is a partial block diagram of the radio signal selective-calling receiver illustrated in FIG. 3.

FIG. 4 illustrates a structure of the base clock signal compensating circuit 120 and also a structure of the base clock oscillating circuit 125.

The base clock signal compensating circuit 120 is comprised of an edge detector 131, a phase-comparator 133, an integration circuit 135, a divider 137, NOT circuit 138, and a circuit 139 for generating a synchronization clock signal.

The edge detector 131, the phase-comparator 133 and the divider 137 constitute the above-mentioned detector 107. The integration circuit 135 and the base clock signal oscillating circuit 125 constitutes the above-mentioned compensator 109. The synchronization clock signal generating circuit 139 constitutes the above-mentioned signal transmitter 111.

The base clock signal oscillating circuit 125 is comprised of a first resistor R1, a second resistor R2, a first capacitor C1, a second capacitor C2, a quartz oscillator XTL, and a diode 141 having a variable capacity.

One of terminals of the first and second capacitors C1 and C2 are grounded. The other terminal of the first capacitor C1 is electrically connected to one of terminals of the quartz oscillator XTL, a p-terminal of the diode 141, and one of terminals of the first resistor R1. The other terminal of the second capacitor C2 is electrically connected to both the other terminal of the quartz oscillator XTL and one of terminals of the second resistor R2. The other terminal of the second resistor R2 is electrically connected to the other terminal of the first resistor R1.

The diode 141 has a p-terminal electrically connected to both the integration circuit 135 and the quartz oscillator XTL, and an n-terminal grounded. Thus, the diode 141 varies a voltage to be applied to the quartz oscillator XTL, in response to an integration signal 153 transmitted from the integration circuit 135.

Hereinbelow is explained an operation of the base clock compensating circuit 120 and the base clock oscillation circuit 125.

First, the edge detector 131 transmits an edge signal 145 defining leading and trailing edges of the demodulated signal 143.

The divider 137 divides a frequency of a base clock signal 147 transmitted from the base clock oscillation circuit 125, and transmits a base clock signal 149 having the thus divided frequency, to the phase-comparator 133.

The phase-comparator 133 compares the edge signal 145 transmitted from the edge detector 131 to the base clock signal 149 transmitted from the divider 137 with respect to a phase, and transmits a phase-difference signal 151 indicative of the detected difference in phase between the signals 145 and 149. The phase-difference signal 151 defines a difference in frequency between the base clock signal of the radio signal selective-calling receiver 105 and the base clock signal transmitted from the base station 101.

Then, the integration circuit 135 converts the phase-difference signal 151 into a dc voltage, and transmits the integration signal 153 indicative of the thus produced dc voltage.

The base clock oscillation circuit 125 compensates for a frequency of the base clock signal in accordance with the dc voltage indicated by the integration signal 153, and transmits the thus compensated base clock signal 155.

A voltage to be applied across the diode 141 is varied in accordance with the dc voltage defined by the phase-difference signal 151. Accordingly, a voltage to be applied across the quartz oscillator XTL is also varied, and hence, a frequency of the base clock signal to be transmitted from the base clock oscillation circuit 125 is also varied.

Accordingly, by selecting such a capacity of the diode 141 that the difference indicated by the phase-difference signal 151 is zero, a base clock signal 155 which has been compensated for so as to have a desired frequency is transmitted from NOT circuit 138.

As mentioned so far, a frequency of the base clock signal 147 of the radio signal selective-calling receiver 105 is compensated for in accordance with the dc voltage defined by the phase-difference signal 151. The dc voltage is a signal produced based on a difference in frequency between the base clock signal 147 of the radio signal selective-calling receiver 105 and the base clock signal transmitted from the base station 101.

The synchronization clock signal generating circuit 139 transmits a synchronization clock signal 157 in accordance with the base clock signal 155 having been compensated for by the compensator 109.

Since the synchronization clock signal 157 is generated based on a frequency of the base clock signal 147 of the radio signal selective-calling receiver 105, the synchronization clock signal 157 would have substantially the same transmission rate as a transmission rate of the demodulated signal 143.

Figure 5:
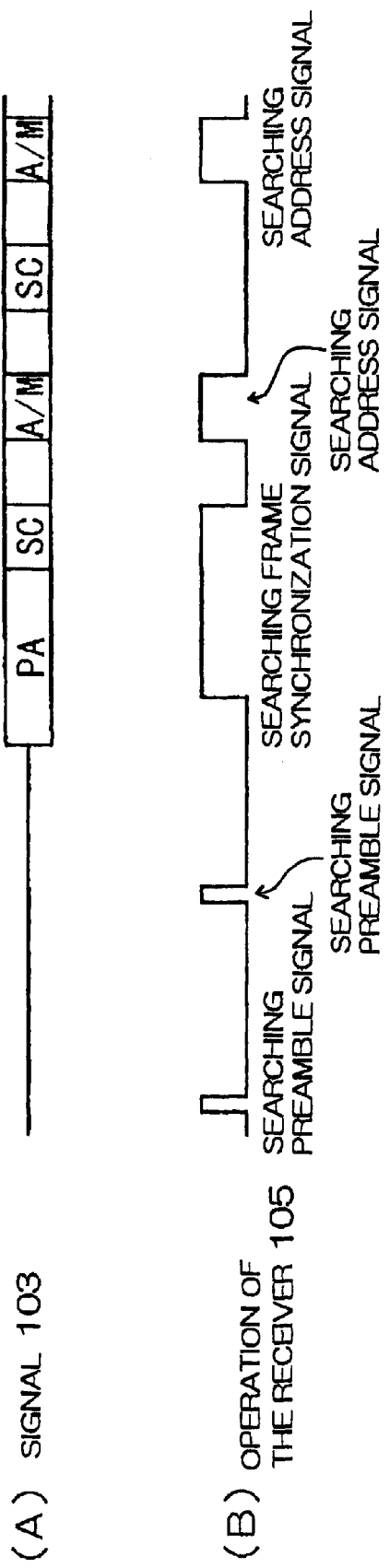
FIG. 5 is a timing chart showing an operation of the radio signal selective-calling receiver in accordance with the preferred embodiment of the present invention.

Hereinbelow is explained an operation of the radio signal selective-calling receiver 105 in accordance with the embodiment, with reference to FIG. 5 which is a timing chart of the POCSAG signal 103 transmitted from the base station 101 in non-synchronized state, and of the operation of the radio signal selective-calling receiver 105.

Figure 1:
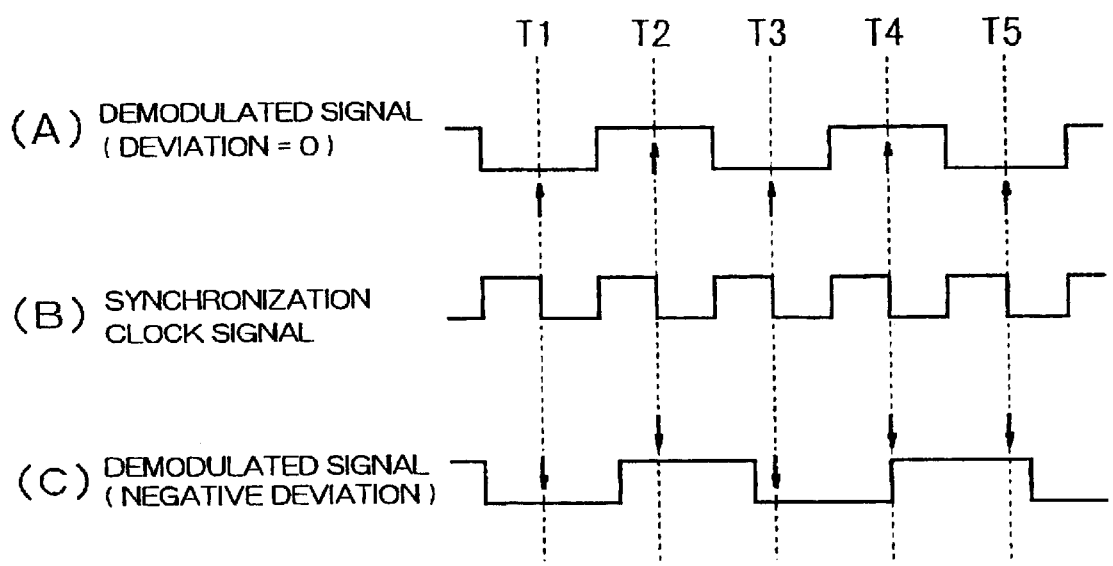
FIG. 1 is a signal chart illustrating waveforms of signals for judging data in a conventional radio signal selective-calling receiver.

The signal 103 transmitted from the base station 101 is illustrated in FIG. 5(A). The signal 103 includes a state in which no signals are transmitted, and a preamble signal (PA) subsequently to the non-signal state. The preamble signal establishes synchronization in the unit of bit, and is comprised of figures 0 and 1 which are alternately repeated.

Subsequently to the preamble signal, a frame synchronization signal (SC) is transmitted for identifying a location of the signal 103. Then, an address signal divided into eight groups and message data (AIM) are transmitted. When addresses are transmitted a lot, the frame synchronization signal and the address signal are repeatedly transmitted.

An operation of the radio signal selective-calling receiver 105 is illustrated in FIG. 5(B). The operation is illustrated in intermittent signal-receiving timing (BS).

First, the radio signal selective-calling receiver 105 conducts preamble search. Specifically, the radio signal selective-calling receiver 105 operates in a quite short period of time to thereby check whether a preamble signal is received or not, in order to detect whether POCSAG signal has been transmitted or not.

When the radio signal selective-calling receiver 105 receives a preamble signal while the radio signal selective-calling receiver 105 is in operation, the radio signal selective-calling receiver 105 establishes synchronization in the unit of bit, based on the thus received preamble signal, to thereby recognize the preamble signal.

When there is a difference in frequency between the base clock signal of the radio signal selective-calling receiver 105 and the base clock signal transmitted from the base station 101, it is impossible to recognize the preamble signal in reading out data, and hence, the above-mentioned procedure having been explained with reference to FIGS. 2, 3 and 4 is carried out.

Figure 6:
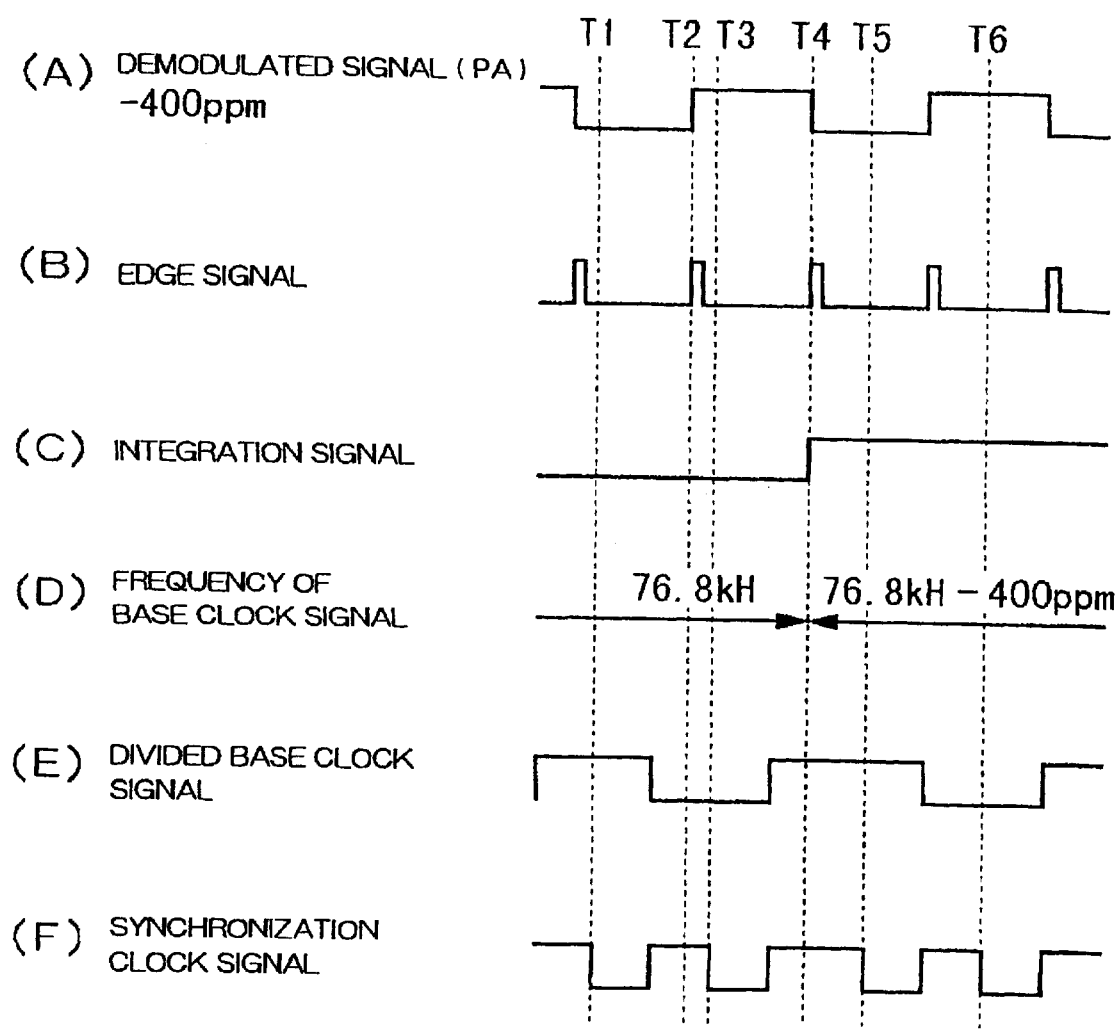
FIG. 6 is a signal chart illustrating waveforms of signals for judging data in the radio signal selective-calling receiver in accordance with the preferred embodiment of the present invention.

An operation of generating the synchronization clock signal is explained hereinbelow with reference to FIGS. 3, 4 and 6.

The signal 103 received at the radio signal processor 115 through the antenna 113 is demodulated in the demodulator 117.

In the embodiment, the signal 103 is designed to have a transmission rate of 1200 bps, a difference between the base clock signal of the radio signal selective-calling receiver 105 and the base clock signal transmitted from the base station 101 is designed to be −400 ppm.

Then, the edge detector 131 detects leading and trailing edges of the demodulated signal 143 illustrated in FIG. 6(A), having a rectangular waveform, and transmits the edge signal 145 as illustrated in FIG. 6(B).

In initial state, a predetermined voltage is applied across the diode 141 in the base clock oscillation circuit 125.

In the embodiment, the quartz oscillator XTL is designed to have an oscillation frequency of 76.8 kHz. Hence, the base clock oscillation circuit 125 oscillates at 76.8 kHz in initial state.

The divider 137 divides the frequency 76.8 kHz of the base clock signal 147 transmitted from the base clock oscillation circuit 125, by 128 to thereby transmit the base clock signal 149 as illustrated in FIG. 6(E), having a frequency of 600 Hz or 1200 bps.

The phase-comparator 133 receives the edge signal 145 from the edge detector 131 and the base clock signal 149 from the divider 137, and compares phases of those signals 145 and 149 to each other. Then, the phase-comparator 133 transmits the phase-difference signal 151 at T4 at which the next edge signal 145 is to be received. The phase-difference signal 151 is indicative of the detected phase-difference resulting from comparison having been carried out at T2.

The integration circuit 135 converts the phase-difference signal 151 to a dc voltage illustrated in FIG. 6(C) as the integration signal 153. A voltage applied across the diode 141 is varied in accordance with the integration signal 153.

Accordingly, a frequency of the base clock signal 147 transmitted from the base clock signal generating circuit 125 is varied in accordance with the dc voltage to be applied across the diode 141.

The diode 141 is designed to have such a capacity that the phase-difference signal 151 is equal in value to zero. Thus, a frequency of the base clock signal 147 transmitted from the base clock generating circuit 125 is compensated for, and the compensated base clock signal 155 is transmitted.

The synchronization clock generating circuit 139 receives the compensated base clock signal 155 having a frequency of 76.8 kHz−400 ppm as illustrated in FIG. 6(D). The synchronization clock generating circuit 139 transmits the synchronization clock signal 157 in accordance with a frequency of the compensated base clock signal 155 illustrated in FIG. 6(F).

Thus, the demodulated signal 143 is judged by means of the synchronization clock signal 157 as to what value the signal 143 has. Namely, the demodulated signal 143 is judged at trailing edges of the synchronization clock signal 157, that is, at T1, T3, T5 and T6. Hence, the demodulated signal 143 is judged to have values 0, 1, 0 and 1.

Figure 7:
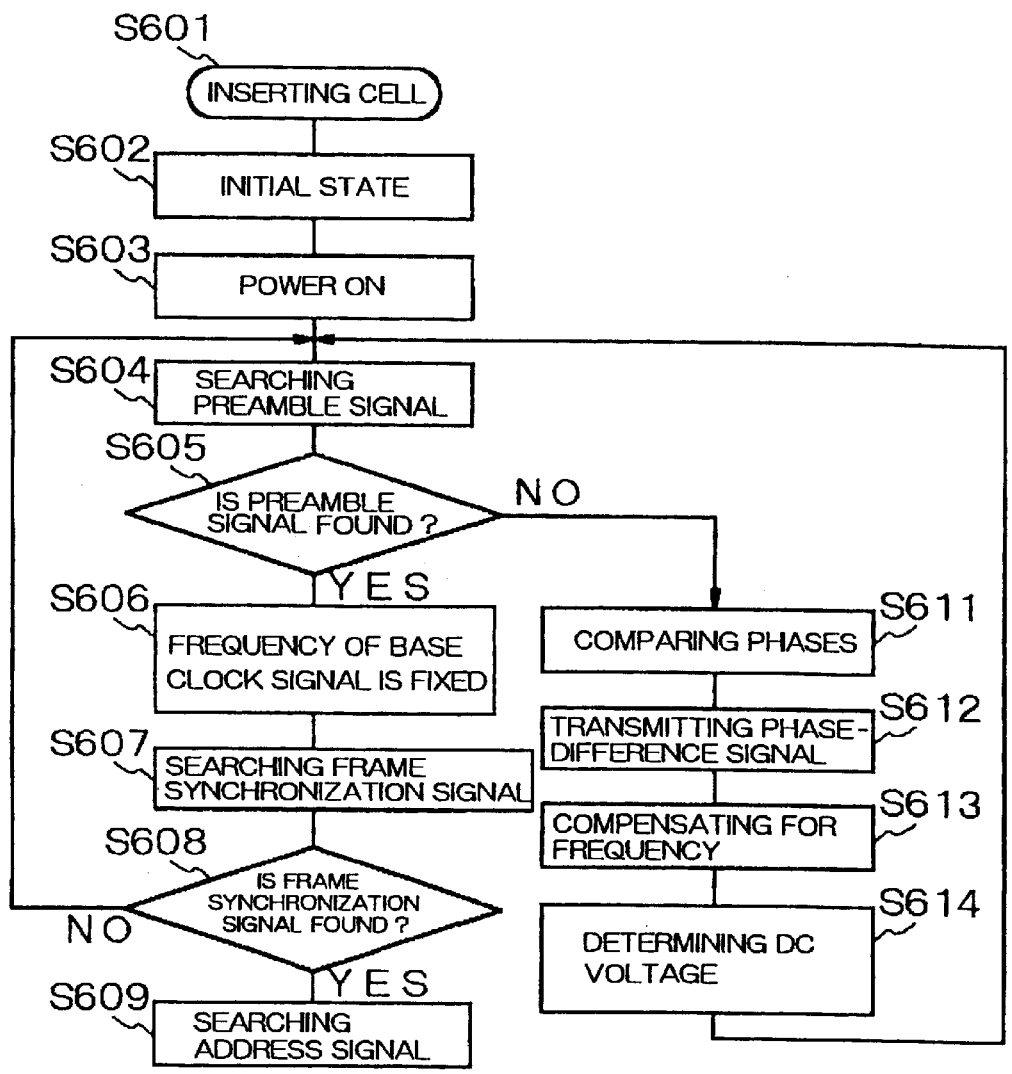
FIG. 7 is a flow chart of a method of receiving radio signals in the radio signal selective-calling receiver in accordance with the preferred embodiment of the present invention.

FIG. 7 is a flow chart of an operation of the radio signal selective-calling receiver 105 in accordance with the embodiment. The illustrated flow chart includes steps of data judgement as having been explained with reference to FIG. 6.

First, a cell is inserted into the radio signal selective-calling receiver 105 at step S601. The base clock oscillation circuit 125 is put into initial state at step S602.

Then, the radio signal selective-calling receiver 105 is turned on at step S603. The radio signal selective-calling receiver 105 starts preamble search at step S604 when a frequency of the base clock signal transmitted from the base clock oscillation circuit 125 is in its initial state, namely, has a frequency of 76.8 kHz. Specifically, the radio signal selective-calling receiver 105 checks as to whether a preamble signal is received or not in step S605.

If it is judged in step S605 that a preamble signal is received, a frequency of the base clock signal 147 is fixed at step S606 by a dc voltage transmitted from the integration circuit 135 at that time, and then the radio signal selective-calling receiver 105 starts searching a frame synchronization signal at step S607.

Thereafter, it is checked as to whether a sign of a frame synchronization signal is found or not at step S608. If a sign of a frame synchronization signal is found at step S608, the radio signal selective-calling receiver 105 starts searching an address signal at step S609. If a sign of a frame synchronization signal is not found at step S608, the radio signal selective-calling receiver 105 starts searching a preamble signal at step S604 with a dc voltage transmitted from the integration circuit 135 being fixed.

If it is judged in step S605 that a preamble signal is not received, such steps as mentioned earlier are carried out by the base clock compensating circuit 120 and the base clock generating circuit 125.

First, there is detected a difference between the base clock signal of the radio signal selective-calling receiver 105 and the base clock signal transmitted from the base station 101. Specifically, the phase-comparator 133 compares a phase of the edge signal 145 to a phase of the divided base clock signal in step S611, and then, transmits the phase-difference signal 151 in step S612.

Then, a frequency of the base clock signal 147 is compensated for in step S613 in accordance with the detected difference. In step S613, such a capacity of the diode 141 that the phase-difference signal 151 is equal in value to zero is selected.

Thus, a dc voltage to be transmitted from the integration circuit 135 is determined at step S614, and the synchronization clock signal 157 is transmitted from the synchronization clock generating circuit 139. Based on the thus generated synchronization clock signal 157, it is checked again as to whether a preamble signal is received or not in preamble searching state in step S604.

The radio signal selective-calling receiver 105 in accordance with the embodiment compensates for a frequency of the base clock signal of the receiver 105 itself to thereby match the frequency to a frequency of the base clock signal transmitted from the base station 101.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-303660 filed on Oct. 26, 1998 including specification, claims, drawings and summary is incorporated herein by reference in its entirety.

What is claimed is:

1. A radio signal selective-calling receiver comprising:
   (a) a detector which detects a difference in frequency between a first base clock signal of said radio signal selective-calling receiver and a second base clock signal of a base station, based on third signals transmitted from said base station which is in communication with said radio signal selective-calling receiver through a communication line;
   (b) a compensator which compensates for said first base clock signal with respect to a frequency in accordance with the detected difference, and transmits a base clock signal having been compensated for, said compensator comprising an integrator converting a phase difference signal between a frequency of the first base clock signal of the radio signal selective-calling receiver and the second base clock signal of the base station, into a dc voltage; and
   (c) a signal transmitter which transmits a synchronization clock signal on the basis of said base clock signal having been compensated for by said compensator.

2. The radio signal selective-calling receiver as set forth in claim 1, wherein said third signals are transmitted from said base station to establish synchronization in the unit of bit in preamble synchronization system.

3. The radio signal selective-calling receiver as set forth in claim 1, wherein said synchronization clock signal has the same transmission rate as a transmission rate of said third signals having been demodulated.

4. The radio signal selective-calling receiver as set forth in claim 1, wherein said detector is comprised of:
   (a1) an edge detector transmitting edge signals which define leading and trailing edges of said third signals having been demodulated;
   (a2) a divider dividing a frequency of said first base clock signal and transmitting the thus divided base clock signal; and
   (a3) a phase-comparator transmitting a phase-difference signal indicative of the detected difference, based on a phase of said edge signals and a phase of said divided base clock signals.

5. The radio signal selective-calling receiver as set forth in claim 1, wherein said compensator further comprises a base clock oscillating circuit compensating for said first base clock signal with respect to a frequency in accordance with the dc voltage.

6. A radio signal selective-calling receiver as claimed in claim 5, wherein said base clock oscillating circuit comprises a variable capacity diode connected to an output of said integrator and an oscillator connected to a p-terminal of the diode.

7. A radio signal selective-calling receiver as claimed in claim 6, wherein said base clock oscillating circuit further comprises first and second capacitors having first ends that are grounded, a second end of the first capacitor is electrically connected to a first end of said oscillator and said p-terminal of the diode, and a second end of the second capacitor is electrically connected to a second end of said oscillator.

8. The radio signal selective-calling receiver as claimed in claim 1, wherein the base clock signal having been compensated for is transmitted from a NOT circuit electrically connected to said integrator.

9. The radio signal selective-calling receiver as claimed in claim 8, wherein the NOT circuit is electrically connected to said p-terminal of the diode.

10. A method of receiving a radio signal in a radio signal selective-calling receiver, comprising the steps of:

detecting a difference in frequency between a first base clock signal of said radio signal selective-calling receiver and a second base clock signal of a base station, based on third signals transmitted from said base station which is in communication with said radio signal selective-calling receiver through a communication line;

converting a phase-difference signal indicative of the detected difference, into a dc voltage;

compensating for said first base clock signal with respect to a frequency in accordance with the thus produced dc voltage, and transmitting a base clock signal having been compensated for; and transmitting a synchronization clock signal on the basis of the compensated frequency of said base clock signal.

11. The method as set forth in claim 10, wherein said third signals are transmitted from said base station to establish synchronization in the unit of bit in preamble synchronization system.

12. The method as set forth in claim 10, wherein said detecting a difference step is comprised of:

transmitting edge signals which define leading and trailing edges of said third signals having been demodulated;

dividing a frequency of said first base clock signal and transmitting the thus divided base clock signal; and transmitting a phase-difference signal indicative of the detected difference, based on a phase of said edge signals and a phase of said divided base clock signals.

13. A data communication system comprising a base station and at least one radio signal selective-calling receiver, said base station transmitting third signals to establish synchronization in a unit of bit in a preamble synchronization system, and being in communication with said at least one radio signal selective-calling receiver through a communication line, said at least one radio signal selective-calling receiver including:

(a) a detector which detects a difference in frequency between a first base clock signal of said at least one radio signal selective-calling receiver and a second base clock signal of said base station, based on said third signals;

(b) a compensator which compensates for said first base clock signal with respect to a frequency in accordance with the detected difference, and transmits a base clock signal having been compensated for, said compensator comprising an integrator converting a phase-difference signal indicative of the detected difference into a dc voltage; and (c) a signal transmitter which transmits a synchronization clock signal on the basis of said base clock signal having been compensated for by said compensator.

14. The data communication system as set forth in claim 13, wherein said synchronization clock signal has the same transmission rate as a transmission rate of said third signals having been demodulated.

15. The data communication system as set forth in claim 13, wherein said detector is comprised of:

(a1) an edge detector transmitting edge signals which define leading and trailing edges of said third signals having been demodulated;

(a2) a divider dividing a frequency of said first base clock signal and transmitting the thus divided base clock signal; and (a3) a phase-comparator transmitting a phase-difference signal indicative of the detected difference, based on a phase of said edge signals and a phase of said divided base clock signals.

16. The data communication system as set forth in claim 13, wherein said compensator further comprises a base clock oscillating circuit compensating for said first base clock signal with respect to a frequency in accordance with the dc voltage.

* * * * *